(12) United States Patent
Choi et al.

(10) Patent No.: US 11,064,335 B2
(45) Date of Patent: Jul. 13, 2021

(54) METHOD AND APPARATUS FOR TRANSMITTING OR RECEIVING DATA BY USING BLUETOOTH LOW ENERGY TECHNOLOGY

(71) Applicant: LG ELECTRONICS INC., Seoul (KR)

(72) Inventors: Jingu Choi, Seoul (KR); Younghwan Kwon, Seoul (KR); Jonghyun Baik, Seoul (KR); Jonghun Song, Seoul (KR); Jinkwon Lim, Seoul (KR); Hangyu Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/622,082

(22) PCT Filed: Jun. 12, 2018

(86) PCT No.: PCT/KR2018/006643
§ 371 (c)(1),
(2) Date: Dec. 12, 2019

(87) PCT Pub. No.: WO2018/230933
PCT Pub. Date: Dec. 20, 2018

(65) Prior Publication Data
US 2020/0186987 A1    Jun. 11, 2020

Related U.S. Application Data

(60) Provisional application No. 62/518,571, filed on Jun. 12, 2017.

(51) Int. Cl.
*H04W 4/80*  (2018.01)
*G06F 8/65*  (2018.01)
(Continued)

(52) U.S. Cl.
CPC ............... *H04W 4/80* (2018.02); *G06F 8/65* (2013.01); *H04W 28/18* (2013.01); *H04W 40/16* (2013.01); *H04W 52/242* (2013.01); *H04W 84/18* (2013.01)

(58) Field of Classification Search
CPC ....... H04W 4/80; H04W 28/18; H04W 40/16; H04W 52/242; H04W 84/18; H04W 4/60; H04W 4/70; H04W 8/00; G06F 8/65
(Continued)

(56) References Cited

U.S. PATENT DOCUMENTS 7,318,172 B2   1/2008 Lou
8,774,007 B2 * 7/2014 Hussain ................. H02J 3/383
                                                    370/241
(Continued)

FOREIGN PATENT DOCUMENTS

WO    2017-011051 A2    1/2017

*Primary Examiner* — Eugene Yun
(74) *Attorney, Agent, or Firm* — Dentons US LLP

(57) ABSTRACT

The present invention relates to a method and an apparatus for transmitting or receiving, by a first manager apparatus, data for provision of a particular service in a mesh network of a wireless communication system. The present invention provides a method and an apparatus for: receiving, from a target apparatus, state information related to update of firmware for providing a particular service; transmitting a request message which requests update of firmware of the target apparatus on the basis of the state information; thereafter, selecting a particular channel from multiple channels for transmission of firmware data, wherein the multiple channels are channels configured to transmit or receive data having a predetermined size or larger; transmitting the firmware data through the particular channel; and receiving, from the target apparatus, a completion message which indicates completion of the update of the firmware, wherein (Continued)

the state information includes a version identifier which indicates the current version of the firmware.

7 Claims, 16 Drawing Sheets

(51) Int. Cl.
    *H04W 28/18*     (2009.01)
    *H04W 40/16*     (2009.01)
    *H04W 52/24*     (2009.01)
    *H04W 84/18*     (2009.01)

(58) Field of Classification Search
    USPC ........................................................ 455/41.2
    See application file for complete search history.

(56) References Cited

U.S. PATENT DOCUMENTS

| | | |
|---|---|---|
| 9,307,067 B2 | 4/2016 | Debates et al. |
| 2015/0281884 A1* | 10/2015 | Smith .................. H04W 4/023 |
| | | 455/456.3 |
| 2016/0321054 A1 | 11/2016 | Hillyard |
| 2017/0017481 A1 | 1/2017 | Cherian et al. |
| 2019/0219663 A1* | 7/2019 | Takizawa ................ H04W 4/04 |

\* cited by examiner (a)

(b)

(a) AoD (b) AoA

METHOD AND APPARATUS FOR TRANSMITTING OR RECEIVING DATA BY USING BLUETOOTH LOW ENERGY TECHNOLOGY

This application is a 35 USC § 371 National Stage entry of International Application No. PCT/KR2018/006643, filed on Jun. 12, 2018, which claims priority to U.S. Provisional Application No. 62/518,571, filed on Jun. 12, 2017, all of which are incorporated by reference in their entirety herein.

TECHNICAL FIELD

The disclosure relates to a method and apparatus for transmitting and receiving data using Bluetooth, that is, a short-distance communication technology, in a wireless communication system and, more particularly, to a method and apparatus for transmitting and receiving data for location estimation and the update of firmware in a mesh network using a Bluetooth low energy (BLE) technology.

BACKGROUND ART

Bluetooth is a short-range wireless technology standard in which various types of devices are wirelessly connected to exchange data at short distances. To enable wireless communication between two devices using Bluetooth communication, a user has to perform a process of discovering Bluetooth devices to communicate with and making a connection request. In the disclosure, the term "device" refers to an equipment or apparatus.

In this case, the user may discover a Bluetooth device according to a Bluetooth communication method to be used using a Bluetooth device, and may then perform a connection with the discovered Bluetooth device.

The Bluetooth communication method includes a basic rate/enhanced data rate (BR/EDR) method and a low energy (LE) method. The BR/EDR method may be called a Bluetooth Classic method. The Bluetooth Classic method includes a Bluetooth technology continued from Bluetooth 1.0 using a basic rate and a Bluetooth technology using an enhanced data rate supported from Bluetooth 2.0.

A Bluetooth low energy (hereafter referred to as Bluetooth LE) technology is applied from Bluetooth 4.0, consumes low power, and can stably provide information of hundreds of kilobytes (KB). In such a BLE technology, devices exchange information using an attribute protocol. Such a BLE method can reduce energy consumption by reducing the overhead of a header and simplifying an operation.

Some of Bluetooth devices do not have a display or a user interface. The complexity of a connection/management/control/disconnection increases between various types of Bluetooth devices and Bluetooth devices to which similar technologies have been applied among the various types of the Bluetooth devices.

Furthermore, Bluetooth may have a relatively high speed with relatively low power and at a relatively low cost, but is suitable for being used in a limited space because it has a maximum of a limited transmission distance of 100 m.

DISCLOSURE

Technical Problem

There is provided a method for transmitting and receiving data for location estimation and the update of firmware in a mesh network of a wireless communication system.

Furthermore, the disclosure provides a method for receiving data for location estimation and measurement data related to a surrounding environment from a sensor and providing a specific service to the place where the sensor has been positioned.

Furthermore, the disclosure provides a method for determining a device for providing a specific service by calculating the distance up to a sensor based on location information transmitted by the sensor if a plurality of devices for providing the specific service has been positioned.

Furthermore, the disclosure provides a method for transmitting and receiving a large amount of data firmware data in a mesh network configured with a plurality of devices.

Furthermore, the disclosure provides a method for selecting a separate channel and transmitting firmware data if the size of the firmware data is large.

Technical objects to be achieved in the disclosure are not limited to the aforementioned technical objects, and other technical objects not described above may be evidently understood by a person having ordinary skill in the art to which the disclosure pertains from the following description.

Technical Solution

The disclosure provides a method of transmitting and receiving data for providing, by a first manager device, a specific service in a mesh network of a wireless communication system.

Specifically, in an embodiment of the disclosure, a method for providing, by a first device, a specific service in a wireless communication system includes receiving, from a target device, state information related to the update of firmware for providing a specific service, transmitting, to the target device, a request message to request the update of the firmware of the target device based on the state information, selecting a specific channel among the plurality of channels for a transmission of firmware data, wherein the plurality of channels is channels configured to transmit and receive data of a specific size or more, transmitting the firmware data through the specific channel, and receiving, from the target device, a complete message indicating a completion of the update of the firmware. The state information includes a version identifier indicative of a current version of the firmware.

Furthermore, the disclosure further includes forming a logical link control and adaptation protocol (L2CAP) connection with the target device, wherein the specific channel is an L2CAP channel.

Furthermore, in the disclosure, the specific channel is selected based on at least one of interference of the mesh network, latency necessary for the firmware data, or reliability.

Furthermore, the disclosure further includes fragmenting the firmware data into a plurality of data based on a data size supported in the specific channel Each the plurality of the fragmented data includes an identifier indicating that the fragmented data corresponds to any fragmented data of the firmware data. The state information further includes a product identifier for identifying the target device.

Furthermore, the disclosure further includes receiving, from the target device, an advertising packet in order to provide the specific service, wherein the advertising packet includes environment information measured by the target device and location information for estimating the location of the target device, estimating the location or direction of the target device based on the location information, and performing a specific operation for providing the specific service based on the estimated location.

Furthermore, the disclosure further includes receiving, from a second manager device, a negotiation request message for determining a manager device for performing the specific operation, wherein the negotiation request message includes a first general parameter and first specific parameter for determining the manager device, determining the manager device among the first manager device and the second manager device based on the first general parameter, the first specific parameter, a second general parameter, and a second specific parameter, and transmitting, to the second manager device, a negotiation response message including determination information indicative of the determined manager device. The specific operation is performed by the determined manager device.

Furthermore, the disclosure further includes receiving advertising packets from the target device and a plurality of adjacent target devices in order to provide the specific service, wherein each of the advertising packets includes environment information measured by each of the plurality of adjacent target devices and the target device and location information for estimating the location of the target device, calculating a distance value indicative of a distance from the first manager device to the target device or the plurality of adjacent target devices based on the location information, calculating a control value for the locations of the target device or each of the plurality of target devices on which the specific operation is to be performed based on the environment information and the calculated distance value, and performing the specific operation based on the calculated control value.

Furthermore, in the disclosure, the control value is calculated by a multiplied value of the distance value and a specific scale factor.

Furthermore, the disclosure includes a communication unit for wireless or wired communication with an outside and a processor functionally connected to the communication unit. The processor is configured to receive, from a target device, state information related to the update of firmware for providing a specific service, transmit, to the target device, a request message to request the update of the firmware of the target device based on the state information, select a specific channel among the plurality of channels for a transmission of firmware data, wherein the plurality of channels is channels configured to transmit and receive data of a specific size or more, transmit the firmware data through the specific channel, and receive, from the target device, a complete message indicating a completion of the update of the firmware. The state information includes a version identifier indicative of a current version of the firmware.

Advantageous Effects

The method of transmitting and receiving data using the Bluetooth low energy (LE) technology according to the disclosure can receive location information for location estimation, transmitted by a sensor, and estimate the location of the sensor.

Furthermore, according to the disclosure, the location of a sensor can be estimated, and a different service can be provided to each location where a sensor has been positioned based on environment information transmitted by the sensor.

Furthermore, according to the disclosure, the direction and distance of a sensor can be estimated based on location information transmitted by the sensor, and a specific service can be provided to an area where the sensor has been positioned through cooperation between a plurality of devices.

Furthermore, according to the disclosure, a separate bearer for the transmission of a large amount of data, such as firmware, in a Bluetooth mesh network can be selected.

Furthermore, according to the disclosure, a large amount of data for the update of firmware can be segmented and transmitted through a selected bearer.

Effects which may be obtained in the disclosure are not limited to the aforementioned effects, and other technical effects not described above may be evidently understood by a person having ordinary skill in the art to which the disclosure pertains from the following description.

MODE FOR INVENTION

The aforementioned objects, features and advantages of the disclosure will become more apparent through the following detailed description with respect to the accompanying drawings. Hereinafter, the embodiments of the disclosure will be described with reference to the accompanying drawings, in which like numbers refer to like elements throughout the disclosure. In describing the disclosure, a detailed description of known techniques associated with the disclosure unnecessarily obscure the gist of the disclosure, it is determined that the detailed description thereof will be omitted.

Hereinafter, a device and method related to the disclosure are described in detail with reference to the accompanying drawings. Suffixes, such as a "module" and "part" for elements used in the following description, are assigned or interchangeably used by considering only the easy of the writing of the disclosure, and do not have distinct meanings or roles themselves.

Furthermore, in the disclosure, a message may be named a data packet, a frame, or a PDU.

Figure 1:
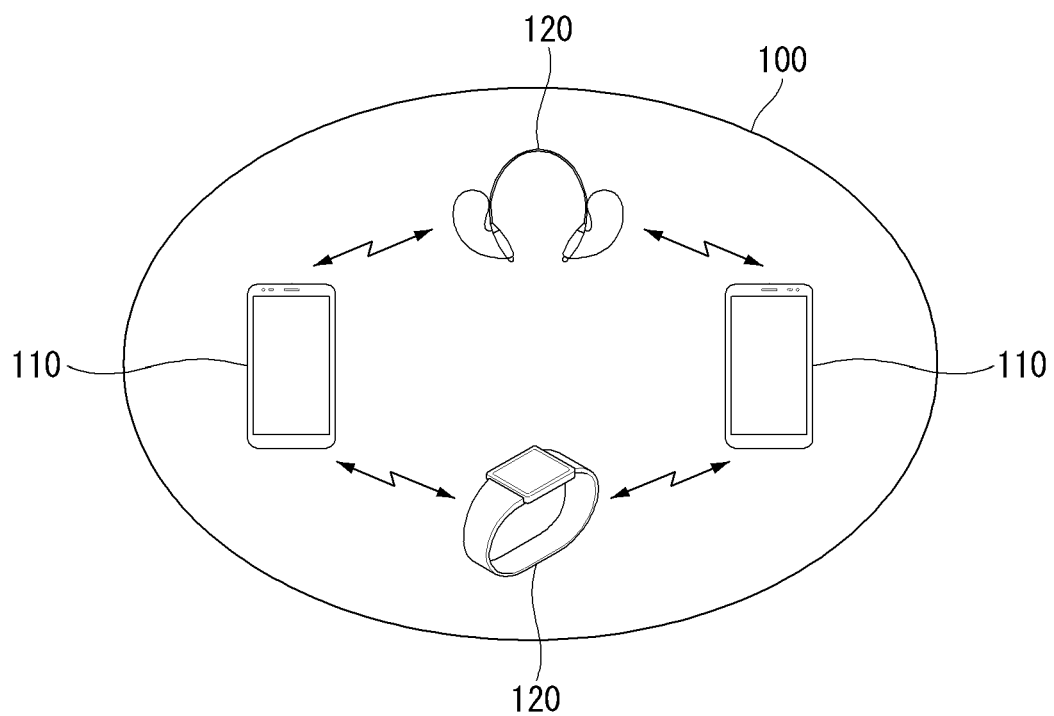
FIG. 1 is a schematic diagram illustrating an example of a wireless communication system using a Bluetooth low energy technology to which the disclosure is applied.

FIG. 1 is a schematic view illustrating an example of a wireless communication system using a Bluetooth low energy technology to which the disclosure is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at a low cost, and significantly reduce power consumption through a low data rate, and thus, it may operate a year or longer when a coin cell battery is used.

Furthermore, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be represent as a data service device, a slave device, a slave, a server, a conductor, a host device, a gateway, a sensing device, a monitoring device, a second device, or an audio gate (AG). The client device 110 may be represent as a master device, a master, a client, a member, a sensor device, a sink device, a collector, a first device, or a hands-free device.

The server device and the client device correspond to major components of the wireless communication system.

The wireless communication system may include components other than the server device and the client device.

The server device refers to a device that receives data from the client device and that provides data to the client device through a response when it receives a data request from the client device by directly performing communication with the client device.

Furthermore, the server device sends a notification message or an indication message to the client device in order to provide data information to the client device. Furthermore, when the server device transmits an indication message to the client device, it receives, from the client device, a confirm message corresponding to the indication message.

Furthermore, in a process of transmitting and receiving notification, indication, and confirm messages to and from the client device, the server device may provide data information to a user through the display unit or may receive a request input by the user through the user input interface.

Furthermore, in a process of transmitting and receiving messages to and from the client device, the server device may read data from the memory unit or may write new data in the corresponding memory unit.

Furthermore, a single server device may be connected to a plurality of client devices, and may be easily re-connected (or coupled) to client devices using bonding information.

The client device 120 refers to a device that requests data information and data transmission from the server device.

The client device receives data through a notification message or an indication message from the server device. When an indication message is received from the server device, the client device sends an acknowledgement message in response to the indication message.

Similarly, in a process of transmitting and receiving messages to and from the server device, the client device may provide information to a user through the display unit or may receive an input from the user through the user input interface.

Furthermore, in a process of transmitting and receiving messages to and from the server device, the client device may read data from the memory unit or may write new data in the corresponding memory unit.

Hardware components, such as the display units, the user input interfaces, and the memory units of the server device and the client device, are described in detail with reference to FIG. 2.

Furthermore, the wireless communication system may configure personal area networking (PAN) through the Bluetooth technology. For example, in the wireless communication system, exchange files, documents, etc. can be exchanged quickly and safely by establishing a private piconet between devices.

Figure 2:
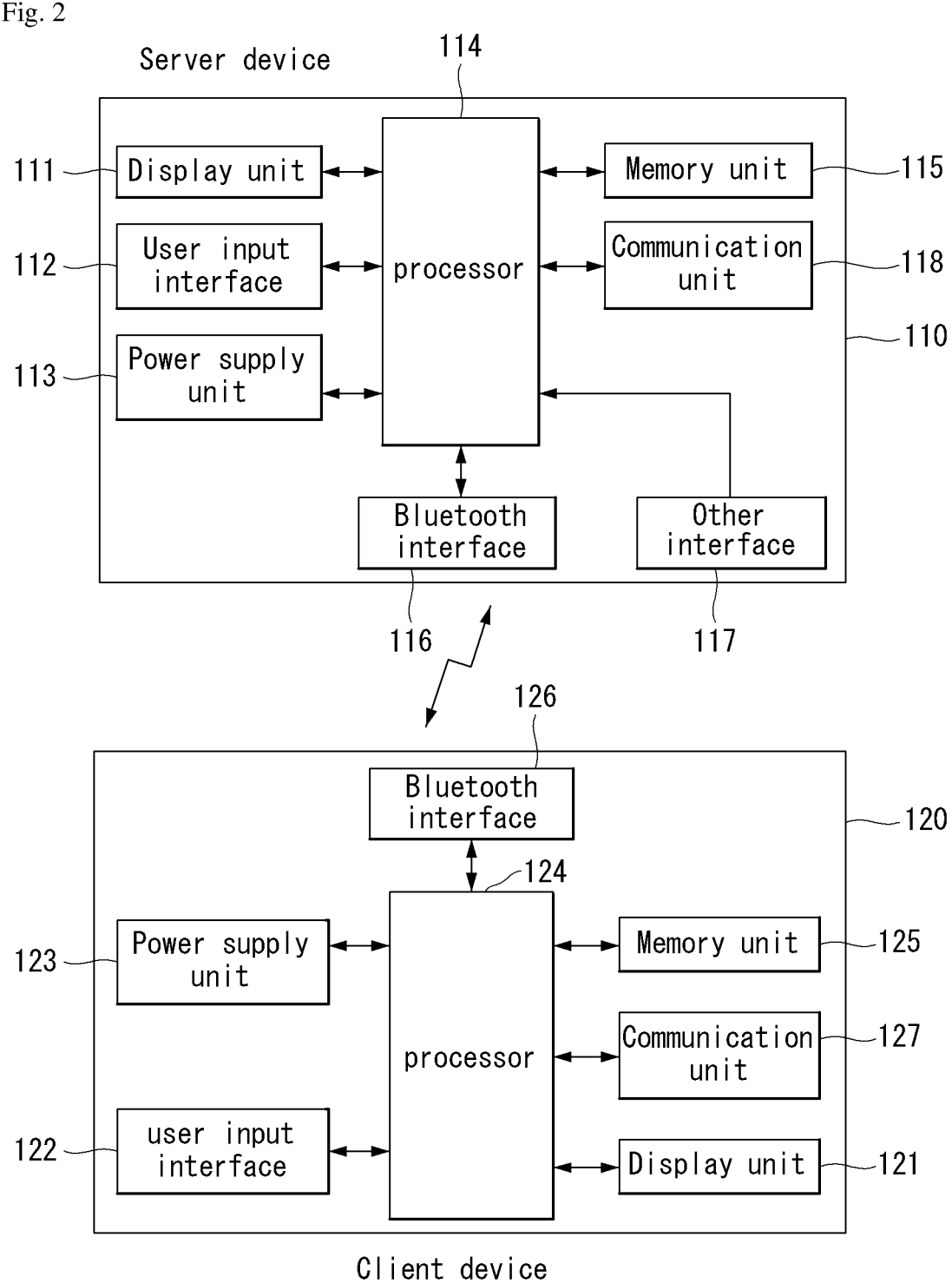
FIG. 2 illustrates an example of internal block diagrams of a server device and a client device to which the disclosure may be applied.

FIG. 2 illustrates an example of internal block diagrams of a server device and a client device capable of implementing methods proposed in the disclosure.

The server device may be connected to at least one client device.

Furthermore, the internal block diagram of each device may further include another element (module, block, unit), and some of the elements of FIG. 2 may be omitted.

As illustrated in FIG. 2, the server device includes a display unit 111, a user input interface 112, a power supply unit 113, a processor 114, a memory unit 115, a Bluetooth interface 116, other interface 117 and a communication unit (or transceiver) 118.

The display unit 111, the user input interface 112, the power supply unit 113, the processor 114, the memory unit 115, the Bluetooth interface 116, other interface 117 and the communication unit 118 are functionally connected to perform a method proposed in the disclosure.

Furthermore, the client device includes a display unit 121, a user input interface 122, a power supply unit 123, a processor 124, a memory unit 125, a Bluetooth interface 126 and a communication unit (or transceiver 127.

The display unit 121, the user input interface 122, the power supply unit 123, the processor 124, the memory unit 125, the Bluetooth interface 126, and the communication unit 127 are functionally connected to perform a method proposed in the disclosure.

The Bluetooth interface 116, 126 refers to a unit or module capable of the transmission of a request/response, instruction, notification, indication/confirm message or data between devices using the Bluetooth technology.

The memory unit 115, 125 is a unit implemented in various types of devices, and refers to a unit in which various types of data are stored.

The processor 114, 124 refers to a module for controlling an overall operation of the server device or the client device, and controls the processing of a request to transmit a message to the Bluetooth interface and other interface and a received message.

The processor 114, 124 may be represented as a control unit, a controller, etc.

The processor 114, 124 may include an application-specific integrated circuit (ASIC), other chipsets, logic circuits and/or a data processor.

The memory unit 115, 125 may include a read-only memory (ROM), a random access memory (RAM), a flash memory, a memory card, a storage medium and/or other storage devices.

The communication unit 118, 127 may include a baseband circuit for processing a radio signal. When an embodiment is implemented in software, the aforementioned scheme may be implemented as a module (process, function, etc.) for performing the aforementioned function. The module may be stored in the memory unit and executed by the processor.

The memory unit 115, 125 may be positioned inside or outside the processor 114, 124 and maybe connected to the processor 114, 124 by various well-known means.

The display unit 111, 121 refers to a module for providing a user with state information of a device and message exchange information.

The power supply unit 113, 123 refers to a module for receiving external power, internal power under the control of the processor and supplying power necessary for an operation of each element.

As described above, the BLE technology has a small duty cycle and can significantly reduce power consumption through a low-speed data transfer rate. Accordingly, the power supply unit can supply power necessary for an operation of each element even with small output power (10 mW (10 dBm) or less).

The user input interface 112, 122 refers to a module for providing the processor with a user input like a screen button so that the user can control an operation of a device.

Figure 3:
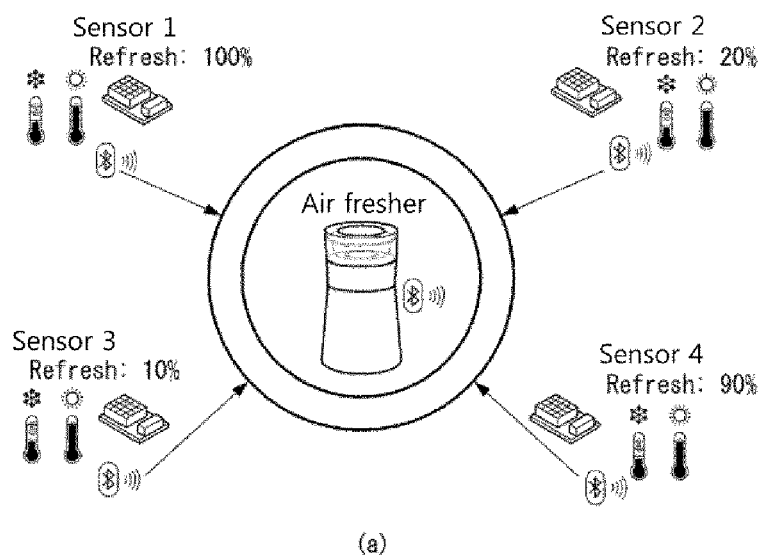
FIG. 3 is a schematic diagram illustrating an example of a method for estimating the location of a sensor and providing a specific service to which the disclosure may be applied.
Figure 3:
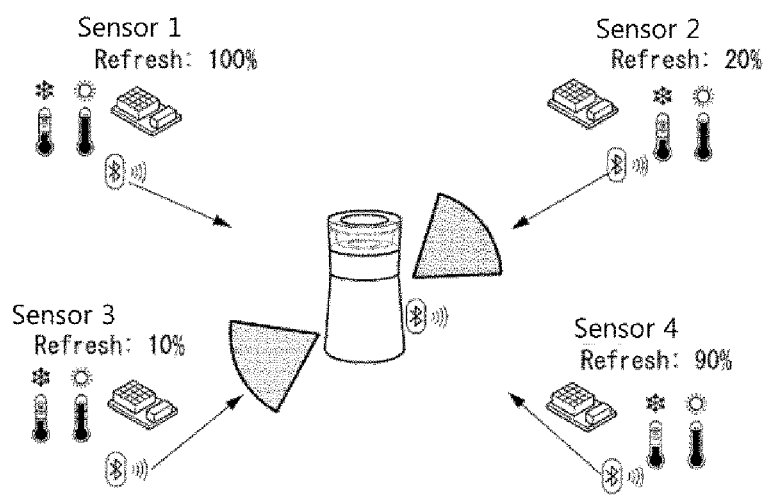

FIG. 3 is a schematic diagram illustrating an example of a method for estimating the location of a sensor and providing a specific service to which the disclosure may be applied.

Referring to FIG. 3, a device providing a specific service may estimate the location of a surrounding sensor, and may provide a specific service based on the estimated location and environment information that is measured and transmitted by a sensor.

Hereinafter, in the disclosure, an example in which a specific service is an air cleaning service and a device is an air fresher is described. However, this is only an example of the disclosure, and the disclosure may be applied to another service and another device in addition to the air cleaning service.

As illustrated in FIG. 3(a), an air fresher obtains sensing information measured by a surrounding sensor, and provides an air cleaning service based on the obtained sensing information.

The sensor may measure environment information (e.g., air state) of the place where the sensor has been positioned, and may transmit measured sensing information (or the environment information) to the air fresher.

The air fresher may obtain sensing information from at least one surrounding sensor, and may adjust the intensity of the air cleaning service based on the obtained sensing information.

However, in FIG. 3(a), the air fresher can adjust the intensity of the air cleaning service by aggregating sensing information obtained from a surrounding sensor, but has a problem in that it cannot provide a different air cleaning service based on the location where each sensor has been positioned.

That is, in FIG. 3(a), the air fresher cannot recognize the location where a sensor that has transmitted a low measured value has been disposed although a measured value indicative of the quality of air, transmitted by a sensor 2 or a sensor 3 is lower than measured value transmitted by a sensor 1 or a sensor 4.

Accordingly, the air fresher has a problem in that it cannot intensively increase the intensity of the air cleaning service for the location where the sensor (the sensor 2 or the sensor 3) having bad quality of air has been the positioned.

In order to solve such a problem, the disclosure provides a method capable of estimating, by an air fresher, the location where each sensor has been positioned and intensively providing an air cleaning service to a location having bad quality of air.

That is, as illustrated in FIG. 3(b), there is provided a method of estimating, by an air fresher, the location of each sensor that has transmitted a measured value including measured quality of air and providing an air cleaning service having different intensity to each location where a sensor has been positioned based on the estimated location and the measured value.

Furthermore, there is provided a method of receiving and updating a large amount of firmware data for providing an air cleaning service if an air fresher is connected through short-distance wireless communication.

Figure 4:
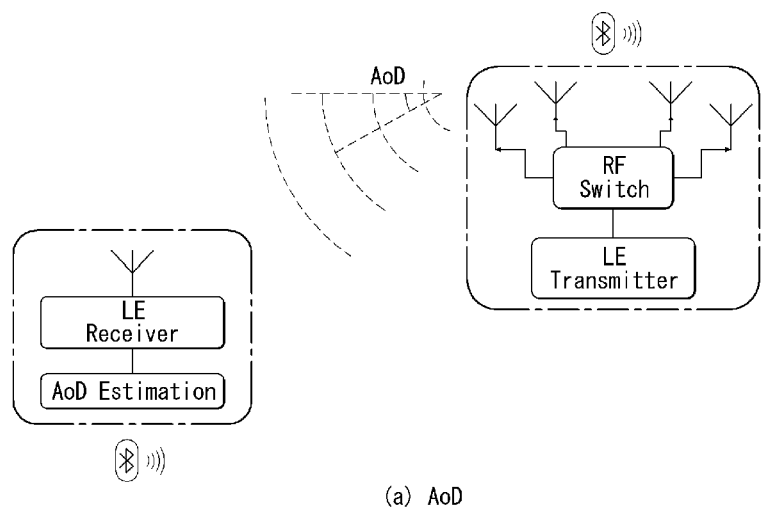
FIG. 4 is a diagram illustrating an example of a method for estimating the location of a sensor to which the disclosure may be applied.
Figure 4:
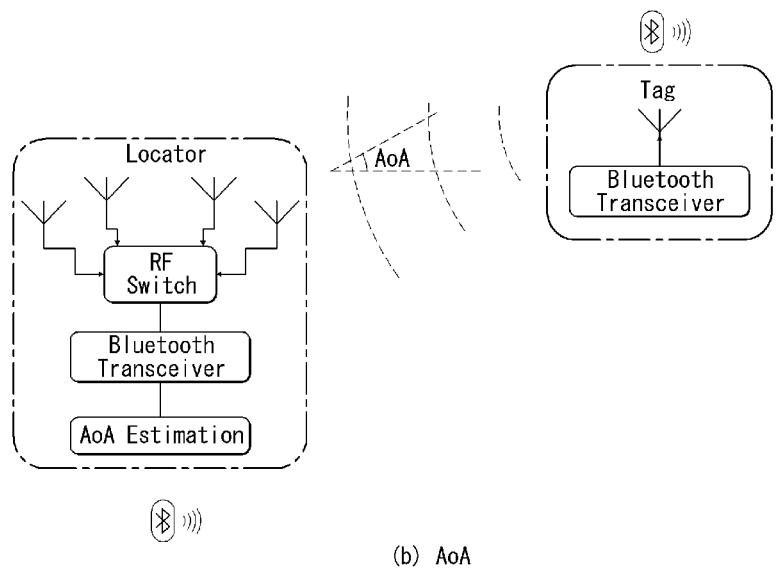

FIG. 4 is a diagram illustrating an example of a method for estimating the location of a sensor to which the disclosure may be applied.

Referring to FIG. 4, an air fresher may estimate the location of a sensor through an angle of departure (AoD) or angle of arrival (AoA) method, and may provide an air cleaning service based on the estimated location of the sensor.

Specifically, FIG. 4(a) illustrates an example of a location estimation method using an AoD, and FIG. 4(b) illustrates an example of a location estimation method using an AoA.

As illustrated in FIG. 4(a), an AoD means a method of relatively estimating the location of a device that has transmitted a packet through the packet transmitted by a device having a plurality of antennas in Bluetooth low energy (LE).

That is, a device configured with a single antenna may detect a relative direction of a device having a plurality of antennas using the AoD method. A device having a plurality of antennas transmits a packet that supports an AoD using an antenna array so that a device having a single antenna can estimate an AoD.

In this case, the packet supporting the AoD may include location information for estimating the location of the device having the plurality of antennas.

Each of all devices having a single antenna that supports an AoD detection function may detect the direction of a device transmitting a packet and including a plurality of antenna, and may calculate its own location using profile level information.

As illustrated in FIG. 4(b), an AoA means a method of relatively estimating the location of a device including a plurality of antennas through a packet transmitted by a device having a single antenna in Bluetooth low energy (LE).

That is, in the AoA, a relative direction of a received packet may be calculated using I and Q samples for an angle of arrival (AoA) method, included in a packet transmitted by a device including a single antenna.

In Bluetooth LE, the direction of a peer device may be recognized by transmitting an AoA support packet within a connection. The peer device may calculate an AoA using an RF switch and an antenna array that support an AoA function.

Through the methods described in FIGS. 4(a) and 4(b), an air fresher may estimate the location of each sensor that transmits a measured value, and may provide a different air cleaning service to each place where a sensor has been positioned based on the estimated location and the measured value.

Hereinafter, in the disclosure, it is assumed that at least one of an air fresher and a sensor includes a plurality of antennas.

Figure 5:
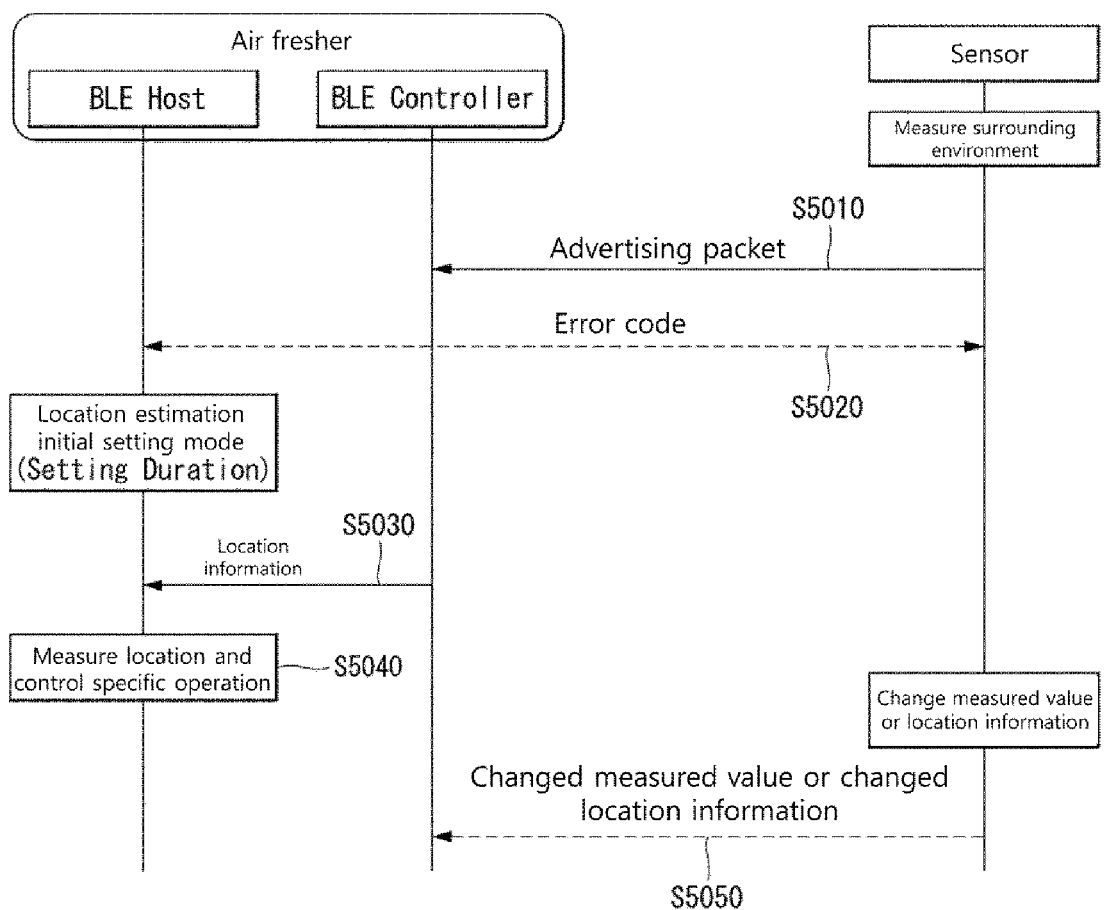
FIG. 5 is a flowchart illustrating an example of a method for estimating the location of a sensor, which is proposed in the disclosure.

FIG. 5 is a flowchart illustrating an example of a method for estimating the location of a sensor, which is proposed in the disclosure.

Referring to FIG. 5, an air fresher may receive an advertising packet from a sensor using Bluetooth LE, may estimate the location of the sensor based on the received advertising packet, and may provide a specific service.

Specifically, the sensor that forms a mesh network of Bluetooth LE with the air fresher measures a surrounding environment (e.g., a degree of air pollution) of its installed location, and transmits, to the air fresher, the advertising packet including a measured value (S5010).

Table 1 illustrates an example of fields configuring location information included in the advertising packet.

TABLE 1

| Field name | Formal |
| --- | --- |
| Antenna Platform Indicator | 6 bits |
| RFU | 2 bits |
| ZoneID | 8 bits |
| Antenna Array Height From Floor | uint16 |
| 3D Orientation Alpha | uint8 |
| 3D Orientation Beta | uint8 |
| 3D Orientation Gamma | uint8 |
| Number of Antenna elements | uint8 |
| Switching ID | 8 bits |
| Switching Sequence Length | uint8 |
| Switching Sequence | uint8 array |
| CompanyID | uint16 |
| Antenna Array Design ID | uint16 |
| Object ID | 8 bits |

As described in FIG. 4, the advertising packet may support an AoA or AoD so that the air fresher can estimate the location of the sensor by detecting the direction of the sensor, and may include location information related to the location of the sensor.

If the air fresher cannot receive the advertising packet transmitted by the sensor, the air fresher may transmit and receive error code to and from the sensor (S5020).

For example, if a measured value and the size of location information transmitted by the sensor cannot be transmitted through the advertising packet, the sensor and the air fresher may exchange error code.

Thereafter, the host of the air fresher may be set as an initial setting mode in order to estimate the location of the sensor by detecting the AoA or AoD of the sensor.

The air fresher may set a parameter and/or duration time for location estimation through the initial setting mode.

The BLE controller of the air fresher may transmit, to the host of the air fresher, a parameter for providing location estimation and an air cleaning service through an HCI Command based on the measured value and location information included in the advertising packet transmitted by the sensor (S5030).

Table 2 illustrates an example of parameters transmitted to the host through the HCI Command.

TABLE 2

| Event | Event Parameters |
| --- | --- |
| HCI_LE_PRA_Report_Event | Subevent_Code, Num_Reports, Event_Type[i], Address_Type[i], Address[i], Length[i], Data[i], RSSI[i], Advertising_Channel_Index[i], Frequency_Offset[i], Extension_Type[i], Sample_Count[i], I_Sample[k], Q_Sample[k] |

The host of the air fresher may compute the direction in which the sensor has been positioned based on the received parameters, and may estimate the location of the sensor based on the computed direction (S5040).

Thereafter, the air fresher may provide a specific service based on the estimated location of the sensor and the measured value.

For example, the air fresher may provide the service by comparing the measured value, transmitted by the sensor, with a measured value transmitted by another sensor and adjusting operation intensity for each location of a sensor.

The air fresher detects the directions of sensors configuring a mesh network for a duration time set by an initial setting mode. The air fresher may not continue to maintain the initial search mode because the detected direction of the sensor is valid until the sensor moves.

That is, if the air fresher has detected the direction of a sensor by the initial setting mode, it may not estimate the location of the sensor until the location of the sensor is changed and new location information is received from the sensor.

If the location information for location estimation or the measured value is changed, the sensor may transmit the changed information to the air fresher (S5050).

In this case, the changed information may include a bit indicative of the changed information and a value of a changed field.

The air fresher may estimate the location of the sensor using such a method, and may provide a different service to the location of each sensor or differently provide the intensity of the same service based on the estimated location and the measured value.

Figure 6:
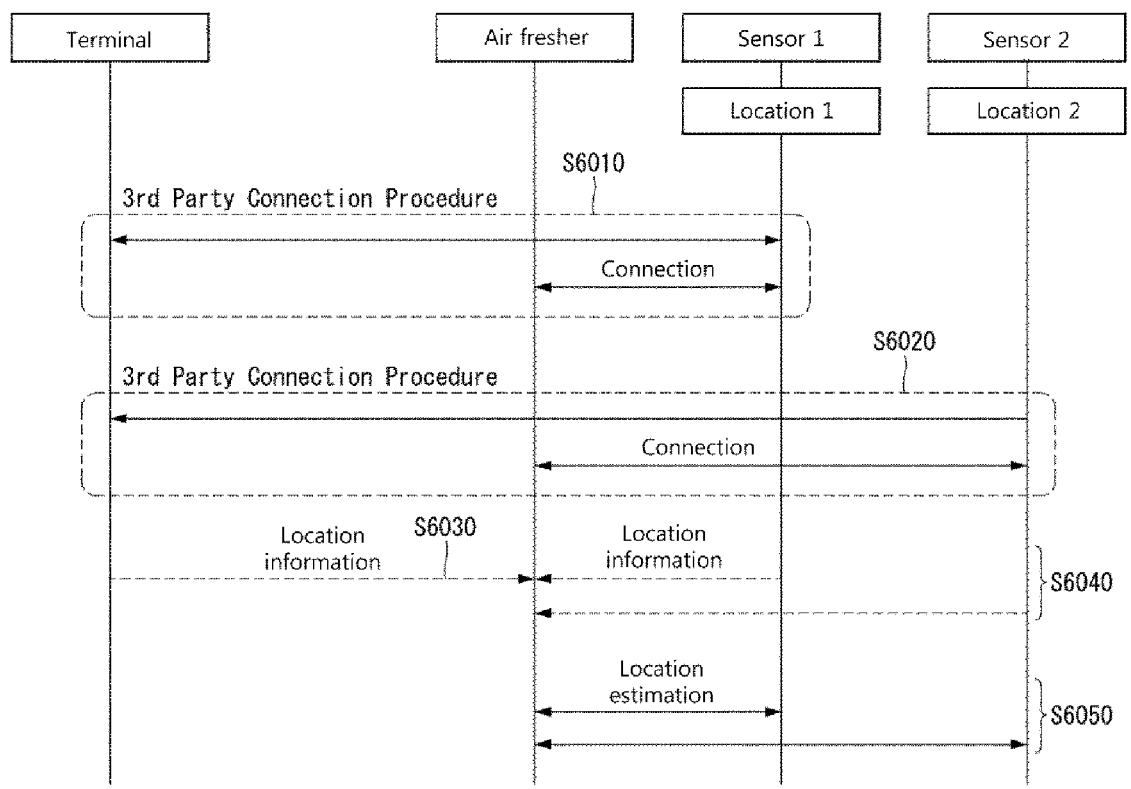
FIG. 6 is a flowchart illustrating another example of a method for estimating the location of a sensor, which is proposed in the disclosure.

FIG. 6 is a flowchart illustrating another example of a method for estimating the location of a sensor, which is proposed in the disclosure.

Referring to FIG. 6, unlike in FIG. 5, an air fresher may receive, from a terminal, location information related to the location where each sensor has been positioned, and may provide a specific service based on the received location information.

Specifically, if a sensor 1 has been positioned at a location 1 and a sensor 2 has been positioned at a location 2, location information for identifying the location where each sensor has been positioned has been stored in the terminal. For example, the terminal may store map information related to the location where each sensor has be positioned.

The terminal may control to form a connection through Bluetooth LE between the air fresher and the sensor 1 or the sensor 2 through a 3' Party Connection Procedure (S6010, S6020).

For example, the terminal may control BLE connection formation between the air fresher and the sensor 1 or the sensor 2 through an Easy Pairing Service.

Specifically, the terminal may transmit, to the air fresher, an indication message indicative of a connection with the sensor 1 or the sensor 2. When the indication message is received from the terminal, the air fresher may form a BLE connection with the sensor 1 or the sensor 2.

Thereafter, the terminal may notify the air fresher of the places where the sensor 1 and the sensor 2 are positioned on a map by transmitting the stored location information of the sensor 1 and the sensor 2 to the air fresher.

Alternatively, the air fresher may recognize the place where the sensor 1 and the sensor 2 are positioned on a map by directly receiving location information from the sensor 1 and the sensor 2 (S6030).

Thereafter, the air fresher may recognize the environments of the location 1 and the location 2 by receiving measured values of surrounding environments measured by the sensor 1 and the sensor 2. For example, the air fresher may receive, from each of the sensor 1 and the sensor 2, a measured value of a measured degree of air pollution for the location where each sensor has been positioned, and may recognize the degree of pollution of each of the location 1 and the location 2 based on the measured value.

The air fresher may estimate the location of the air fresher by measuring proximity between the sensor 1 or the sensor 2 and the air fresher based on the location information transmitted by the terminal or the sensor 1 and the sensor 2 (S6050).

The air fresher may provide a different service or a service having different intensity to each of the location 1 and the location 2 based on the recognized location and the measured value transmitted by each of the sensor 1 and the sensor 2.

Although both the air fresher and the sensors use a single antenna, the locations of the sensors can be estimated and a service having different intensity can be provided through such a method.

In another embodiment of the disclosure, if the terminal, the air fresher, the sensor 1 and the sensor 2 form a Bluetooth mesh network, step S6010 and step S6020 may not be performed.

Figure 7:
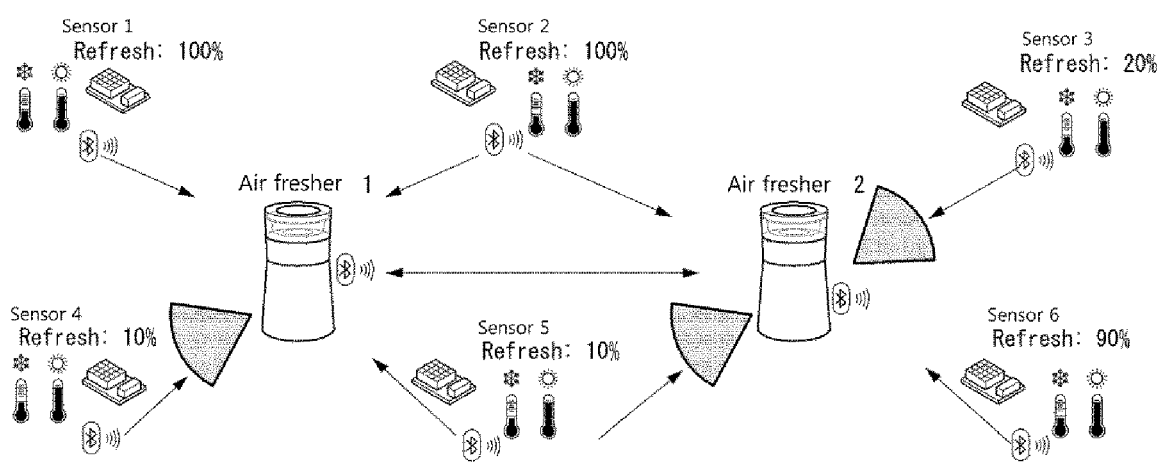
FIG. 7 is a diagram illustrating an example of a method for providing service through cooperation based on the location of a sensor, which is proposed in the disclosure.

FIG. 7 is a diagram illustrating an example of a method for providing service through cooperation based on the location of a sensor, which is proposed in the disclosure.

Referring to FIG. 7, if a plurality of air freshers and a plurality of sensors have been disposed, the plurality of air freshers may perform a specific operation through cooperation.

Specifically, as illustrated in FIG. 7, if air freshers 1 and 2 have been positioned, if a degree of air pollution of the location where a sensor 5 has been positioned is poorer than that of the location where another sensor has been positioned, it may be inefficient for both the air freshers 1 and 2 to increase the intensity of a service in the direction in which the sensor 5 has been positioned.

Accordingly, in order to solve such a problem, when the sensor 5 requests to raise operation intensity from the air fresher 1 or 2 or the air fresher 1 and 2 may determine a device for increasing operation intensity of the location where the sensor 5 has been positioned through negotiations.

Hereinafter, a detailed method is described.

Figure 8:
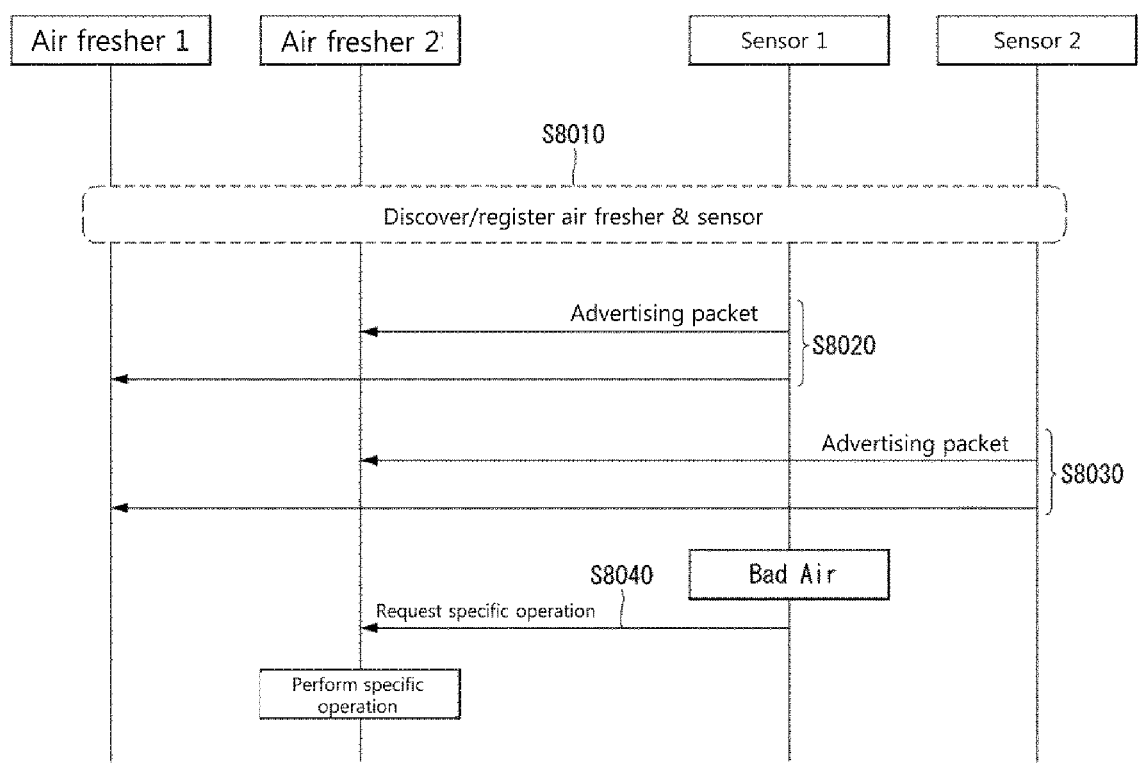
FIG. 8 is a flowchart illustrating an example of a method for providing service through cooperation based on the location of a sensor, which is proposed in the disclosure.

FIG. 8 is a flowchart illustrating an example of a method for providing service through cooperation based on the location of a sensor, which is proposed in the disclosure.

Referring to FIG. 8, if a plurality of air freshers and a plurality of sensors have been disposed, a sensor may be intensively provided with a specific service by directly requesting, from a specific air fresher, the enhancement of operation intensity for the specific service.

First, it is assumed that the plurality of air freshers or the plurality of sensors has been equipped with a plurality of antennas for location estimation.

Specifically, the plurality of air freshers and the plurality of sensors may recognize respective IDs through mutual discovery procedures and registration procedures (S8010).

Each of a sensor 1 and a sensor 2 measures the surrounding environment (e.g., a degree of air pollution) of the location where each sensor has been positioned, and transmits, to each of air freshers 1 and 2, an advertising packet including a measured value based on the recognized ID (S8020, S8030).

In this case, the advertising packet has the same packet format as the advertising packet described in FIG. 5. Each of the air freshers 1 and 2 may estimate the location of each of the sensor 1 and the sensor 2 through the method described in FIG. 5.

Thereafter, if the sensor 1 recognizes that a degree of air pollution of the place where the sensor 1 has been positioned is bad, it transmits, to the air fresher 1 or the air fresher 2, a request message to request a specific operation or the enhancement of intensity of the specific operation (S8040).

Thereafter, the air fresher 1 or the air fresher 2 that has received the request message may perform the specific operation or enhance the intensity of the specific operation based on the estimated location of the sensor 1 and the measured value.

For example, the air fresher 1 or the air fresher 2 may provide an air cleaning service in the direction in which the sensor 1 has been positioned or enhance the intensity of the air cleaning service.

Figure 9:
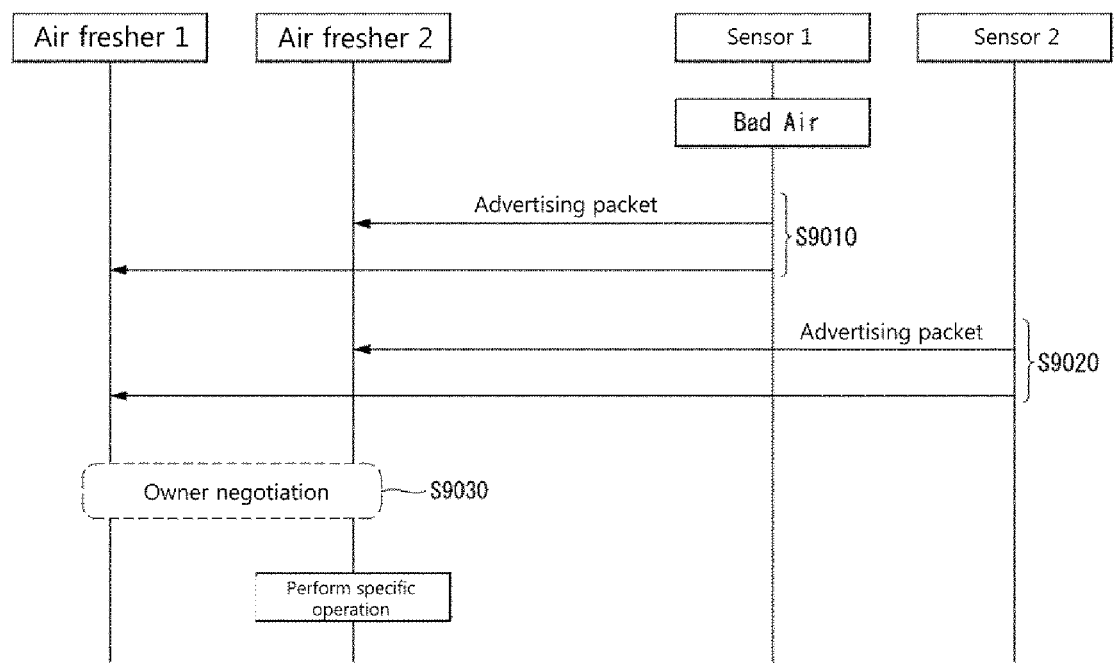
FIG. 9 is a flowchart illustrating another example of a method for providing service through cooperation based on the location of a sensor, which is proposed in the disclosure.

FIG. 9 is a flowchart illustrating another example of a method for providing service through cooperation based on the location of a sensor, which is proposed in the disclosure.

Referring to FIG. 9, unlike in FIG. 8, although there is no request from a sensor, air freshers may negotiate a device that will perform a specific operation in the direction in which a specific sensor has been positioned.

First, it is assumed that a plurality of air freshers or a plurality of sensors has been equipped with a plurality of antennas for location estimation.

Specifically, the plurality of air freshers and the plurality of sensors may recognize respective IDs through mutual discovery procedures and registration procedures.

Step S9010 and step S9020 are the same as step S8010 and step S8020 of FIG. 8, and thus description thereof is omitted.

Thereafter, an air fresher 1 and an air fresher 2 perform an owner negotiation procedure in order to negotiate whether both the air fresher 1 and the air fresher 2 can perform a specific operation in the direction in which a sensor 1 has been positioned and a device that will perform the specific operation.

If a device that will perform the specific operation is determined through the owner negotiation procedure, the determined device (e.g., the air fresher 2) may perform the specific operation in the direction in which the sensor 1 has been positioned.

In this case, the device that will perform the specific operation may be determined based on proximity to the sensor 1, the amount of remaining battery of the air fresher, and the number of sensors for a specific service provided by the air fresher.

The owner negotiation procedure is described later in detail with reference to FIG. 10.

Through such a method, although a plurality of air freshers has been disposed, an efficient service can be provided through negotiations.

Figure 10:
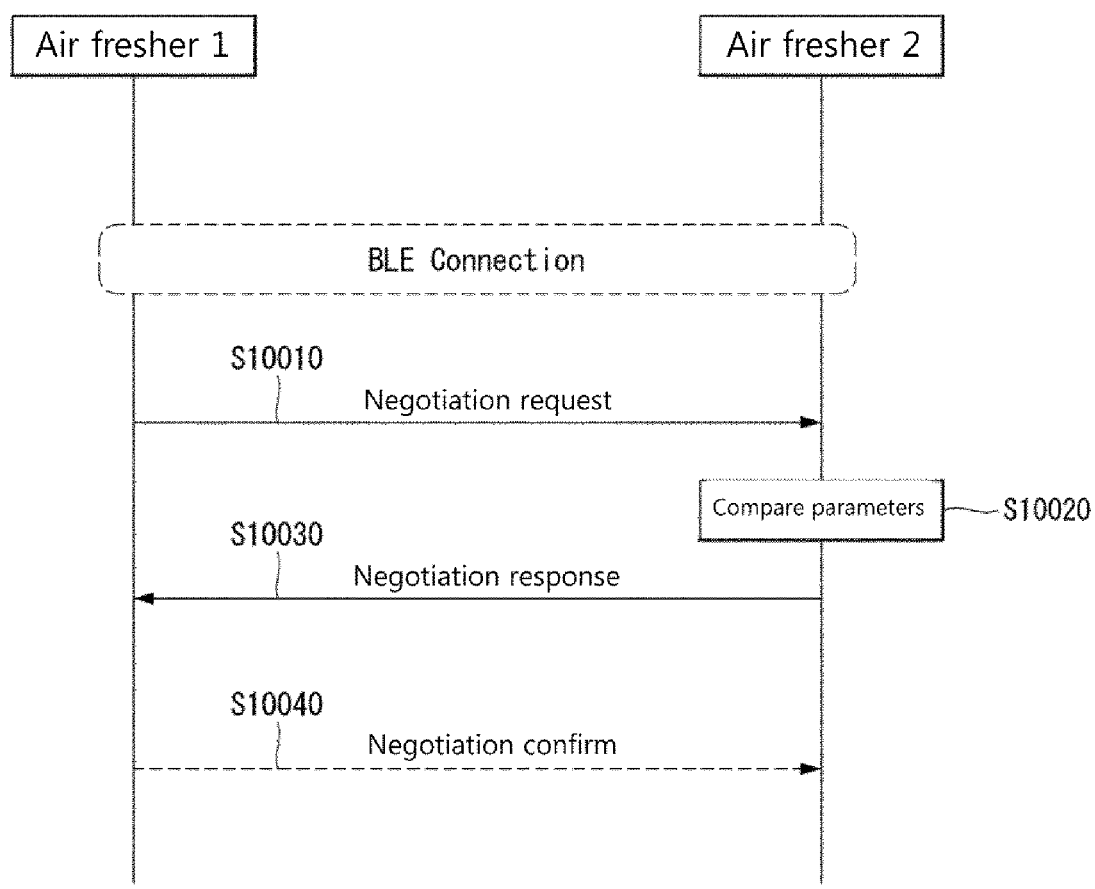
FIG. 10 is a flowchart illustrating an example of a method for determining an apparatus for providing service, which is proposed in the disclosure.

FIG. 10 is a flowchart illustrating an example of a method for determining an apparatus for providing service, which is proposed in the disclosure.

Referring to FIG. 10, for the owner negotiation procedure described with reference to FIG. 9, devices may determine a specific device as a device for providing a service based on a comparison between parameters for providing the service.

Specifically, when an air fresher 1 and an air fresher 2 receive measured environment information from the same sensor, they may perform an owner negotiation procedure in order to determine an air fresher that will perform a specific operation in the direction in which a sensor has been positioned.

For example, if a measured value measured by a sensor indicates that a degree of air pollution is bad, the air fresher 1 and the air fresher 2 may perform an owner negotiation procedure in order to determine an air cleaning service or an air fresher that will enhance the intensity of the air cleaning service in the direction in which the sensor has been positioned.

It is assumed that the air fresher 1 and the air fresher 2 have formed a BLE connection through a connection procedure.

The air fresher 1 may transmit, to the air fresher 2, a negotiation request message through an owner negotiation procedure (S10010).

The negotiation request message may include a general parameter and a specific parameter (or function parameter) in order to determine a device for providing an air cleaning service.

The general parameter means parameters related to the environment setting of each air fresher. The specific parameter means a value obtained by digitizing the suitability of service provision based on a user's use case and setting.

Table 3 illustrates an example of the general parameter.

TABLE 3

| Parameter | Description |
|---|---|
| Number of Sensors | Number of sensors now present nearby |
| Proximity level | Degree indicating that how close a sensor that has detects bad air is located |
| Operation Busy Level | Marginal operation in which a CPU and memory that are being used are considered |
| Managing Coverage | Distance range that is being managed |

Thereafter, the air fresher 2 determines a device for providing a service by comparing the parameter of the air fresher 1, included in the negotiation request message, with its own parameter (S10020).

The air fresher 2 transmits a negotiation response message, including a result of the comparison and result information indicative of the determined device, to the air fresher 1 as a response to the negotiation request message (S10030).

The air fresher 1 may recognize the device that will provide the service based on the result information, and may transmit a negotiation confirm message, including information on the device that will provide the service, to the air fresher 2 (S10040).

Thereafter, the determined device may perform an operation for providing a specific service in the direction in which the sensor has been positioned.

Figure 11:
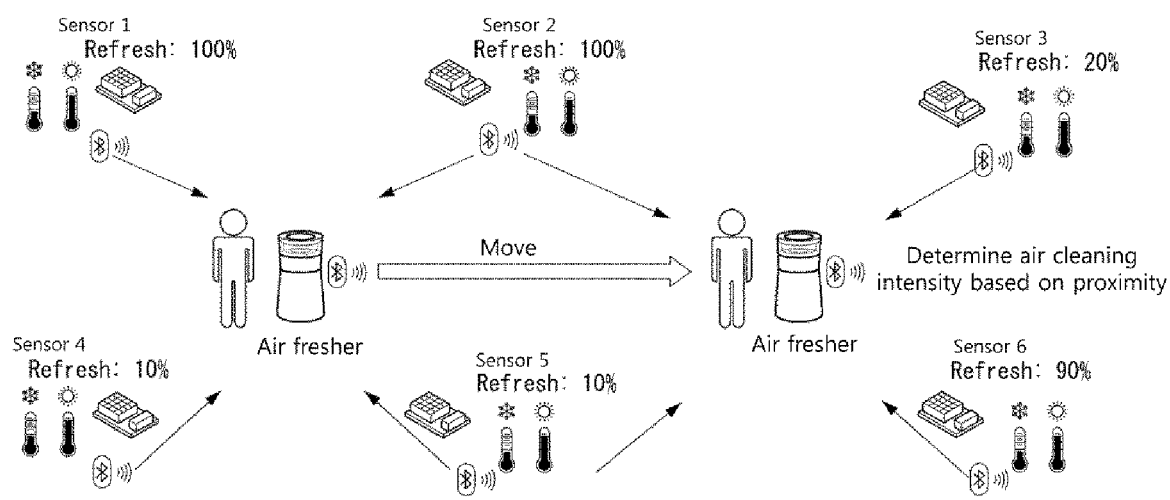
FIG. 11 is a diagram illustrating an example of a method for providing service based on the location of a sensor and a device, which is proposed in the disclosure.

FIG. 11 is a diagram illustrating an example of a method for providing service based on the location of a sensor and a device, which is proposed in the disclosure.

Referring to FIG. 11, if the location of a device (e.g., portable air fresher) is changed, the device may compute a degree of proximity to surrounding sensors, and may provide a service having different intensity in the direction in which each of the sensors has been positioned based on the computed degree of proximity.

Specifically, if an air fresher is for a portable use, the location of an air fresher may be changed by a user.

If an air fresher has a poor possibility that the location of the air fresher will change, it may perform a specific operation (e.g., air cleaning) in all directions in which adjacent sensors have been positioned based on measured values transmitted by the adjacent sensors.

In this case, the intensity of a specific operation may be changed depending on the locations of the adjacent sensors.

As illustrated in FIG. 11, however, if an air fresher is for a portable use, it may perform a specific operation by further focusing on environment information transmitted by a sensor currently positioned at a location closer to the location of the air fresher although it receives measured environment information from all of a sensor 1 to a sensor 6, that is, adjacent sensors.

Furthermore, the location of a portable air fresher may frequently change. The portable air fresher may estimate the distance up to sensors and control the provision of service based on the estimated distance.

That is, the portable air fresher may measure proximity to each server and control the intensity of service and whether to provide service based on the measured proximity.

To this end, each sensor may include a parameter (e.g., RSSI) capable of measuring a degree of proximity in an advertising packet so that a portable air fresher can measure a degree of proximity.

The portable air fresher may assign scale factors to parameters included in advertising packets transmitted by the respective sensors, and may determine the intensity of service and whether to provide service in the direction of each sensor.

Figure 12:
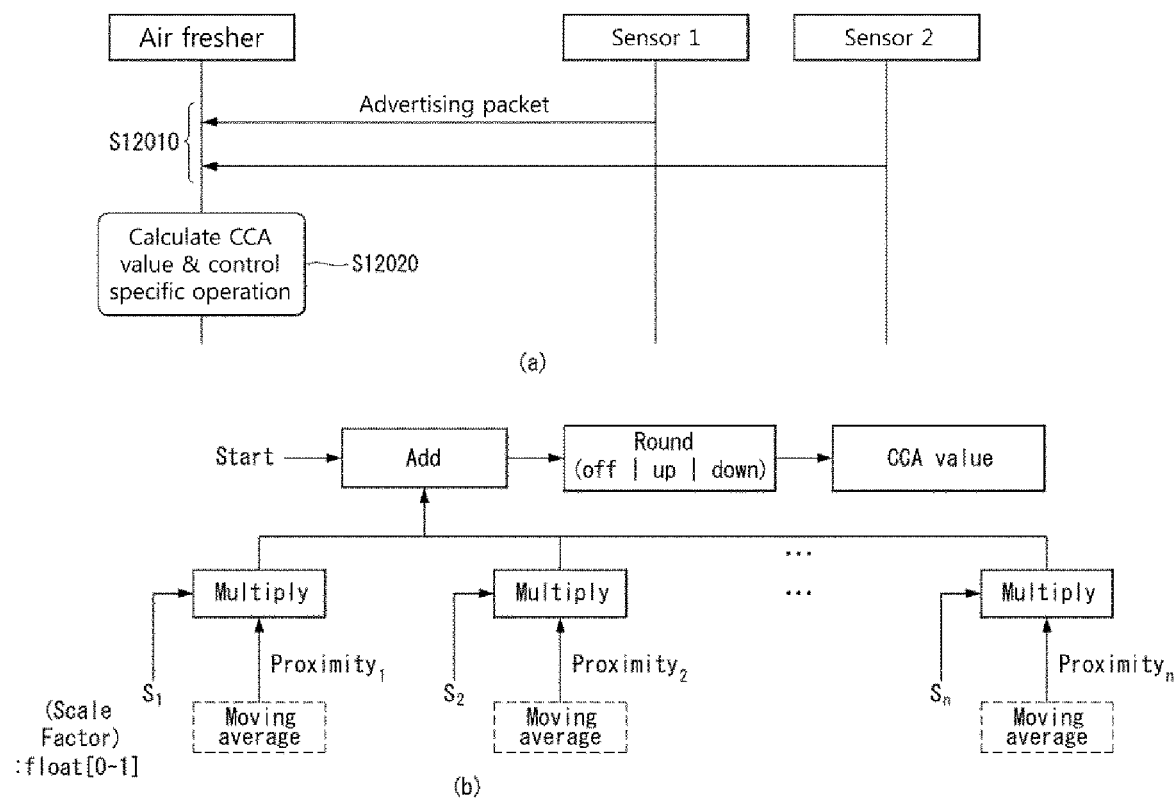
FIG. 12 is a flowchart illustrating an example of a method for providing service based on the location of a sensor and a device, which is proposed in the disclosure.

FIG. 12 is a flowchart illustrating an example of a method for providing service based on the location of a sensor and a device, which is proposed in the disclosure.

Referring to FIG. 12, as described in FIG. 11 a portable air fresher may estimate a degree of proximity based on an advertising packet transmitted by each sensor, and may determine whether to provide service and intensity of the service based on the estimated degree of proximity.

Specifically, as illustrated in FIG. 12(a), the air fresher receives advertising packets from a sensor 1 and a sensor 2 (S12010).

The advertising packet may include environment information of a surrounding environment measured by the sensor 1 or the sensor 2 and a value, such as an RSSI or Tx power for enabling the air fresher to estimate a degree of proximity.

Furthermore, the advertising packet may further include location information for estimating the location of the sensor 1 or the sensor 2.

The air fresher that has received the advertising packets from the sensor 1 and the sensor 2 computes a degree of proximity based on information included in each packet, and calculate a value indicating whether to provide service and intensity of the service (hereinafter referred to as a control assignment value (CCA) value or a control value) based on the computed degree of proximity and a scale factor according to the degree of proximity (S12020).

The CCA value may be calculated as illustrated in Equation 1 and FIG. 12(b).

$$CCA = \sum_{n=1}^{Num(P_n)} (S_n \cdot P_n), \sum_{n=1}^{Num(S_n)} S_n = 1 \quad \text{[Equation 1]}$$

In FIG. 12(b) and Equation 2, P indicates proximity, and S indicates a scale factor.

As illustrated in FIG. 12(b), the portable air fresher computes the proximity of each sensor based on the advertising packet transmitted by each of the adjacent sensors, and assigns a scale factor based on the computed proximity.

In this case, the scale factor may be adjusted based on the computed proximity. For example, in FIG. 12, if the sensor 1 is closer to the air fresher compared to the sensor 2, the air fresher may assign a greater scale factor to a measured value transmitted by the sensor 1.

The portable air fresher may adjust whether to provide service and intensity of the service based on the proximity degree of the sensor using such a method.

In the embodiments described in FIGS. 11 and 12, not only proximity, but a multi-antenna environment value of each sensor may be used.

Figure 13:
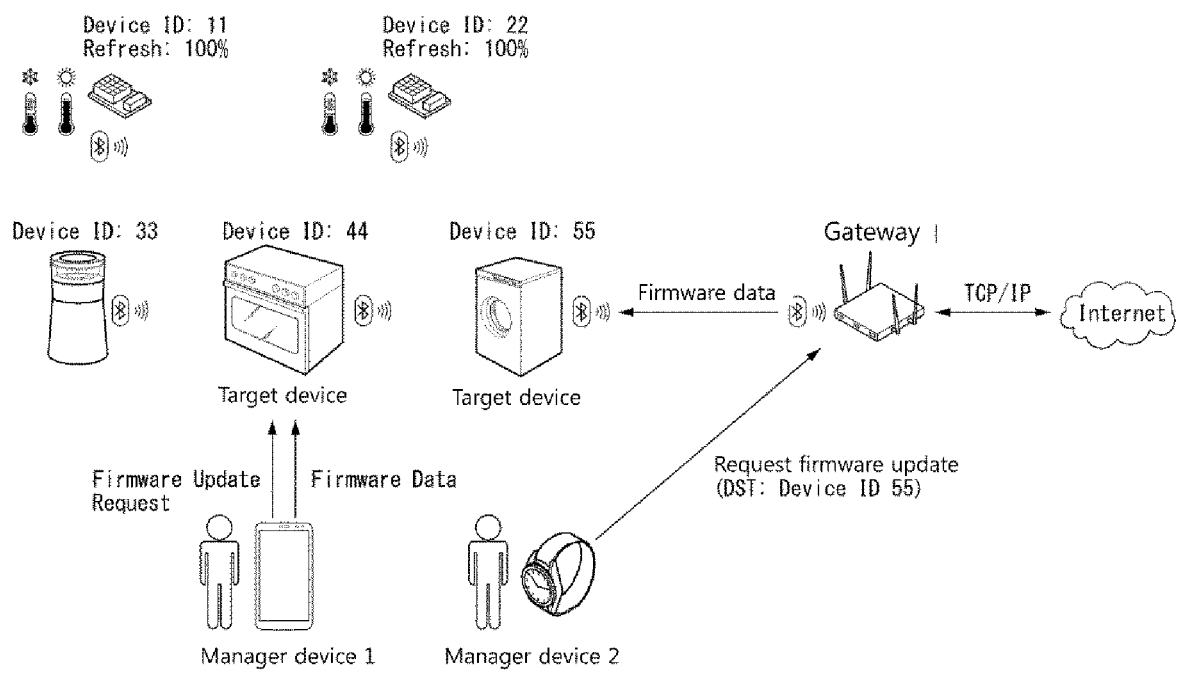
FIG. 13 is a diagram illustrating an example of a method for transmitting and receiving a large amount of firmware data for providing service in a mesh network, which is proposed in the disclosure.

FIG. 13 is a diagram illustrating an example of a method for transmitting and receiving a large amount of firmware data for providing service in a mesh network, which is proposed in the disclosure.

Referring to FIG. 13, if devices of Bluetooth have configured a mesh network in order to provide service, such as an air cleaning service, firmware may be updated by transmitting a large amount of firmware data through a specific channel.

Specifically, a manager device (e.g., a phone or smart watch) may update the firmware of a target device that configures a mesh network through Bluetooth LE in order to provide a specific service (e.g., air cleaning service).

Furthermore, in the case of the transmission and reception of a large amount of data for the update of firmware, the manager device may instruct a gateway to update the firmware of target device because a long time is taken for the transmission and reception.

In this case, the manager device may transmit, to the gateway, an ID for identifying the target device whose firmware will be updated. The gateway may update the firmware of the target device in place of the manager device.

If a large amount of data, such as firmware data, is transmitted to the target device through the same method as that of control data (e.g., transmission through an advertising channel), however, a problem, such as a throughput reduction, latency occurrence, or interference occurrence, may occur.

In order to solve such a problem, the disclosure proposes a method of transmitting and receiving a large amount of data, such as data for the update of firmware in a mesh network, through a specific channel (or bearer).

Figure 14:
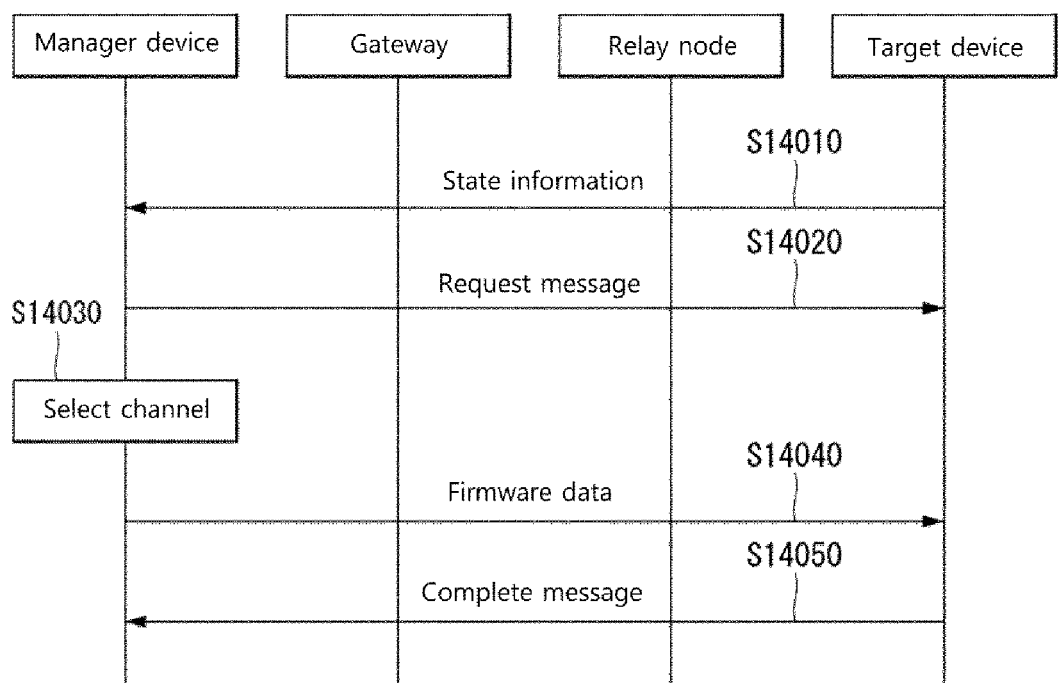
FIG. 14 is a flowchart illustrating an example of a method for transmitting and receiving a large amount of firmware data for providing service in a mesh network, which is proposed in the disclosure.

FIG. 14 is a flowchart illustrating an example of a method for transmitting and receiving a large amount of firmware data for providing service in a mesh network, which is proposed in the disclosure.

Referring to FIG. 14, a manager device may transmit firmware data to a target device through a specific channel for the update of firmware for providing a specific service.

Specifically, it is assumed that the manager device, a gateway, a relay node and a target device have formed a mesh network through Bluetooth LE.

The manager device may receive, from the target device, state information related to the update of firmware, such as software version information and firmware state information of the target device (S14010).

The state information may include a version identifier (or software version identifier) indicative of the current firmware version of the target device and/or a product identifier (or device identifier) for identifying the target device.

The manager device may determine whether the update of firmware of the target device is necessary based on the state information received from the target device. If it is determined that the update of firmware is necessary, the manager device may transmit, to the target device, a request message to request firmware updates (S14020).

In this case, whether the update of the firmware is necessary may be determined based on information input by a user. That is, the manager device may output the software version and/or state of the firmware of the target device. When an input related to the update of the firmware is received from a user, the manager device may transmit, to the target device, the request message to request the update of the firmware.

In this case, the request message may include the following parameters for the update of the firmware.

Scheduled Time: the update of firmware is scheduled to be performed after a given time without being immediately performed.

Fast Update: update is instructed to be performed at a high speed (update is performed by bearing interference occurrence a little).

Bearer Selection: select a channel to be used for updates (Advertising Extension, Object Transfer)

Current Update State: an offset indicating the situation of updates performed so far.

Thereafter, the manager device may select a channel for transmitting firmware data for the update of firmware (S14030), and may transmit the firmware data to the target device through the selected channel (S14040).

One of the following three channels may be used as the channel for the firmware data.

Mesh Advertising channel: a channel for transmitting a control message (e.g., advertising packet) in a mesh network Mesh Advertising Extension Channel: a channel for transmitting data having a larger size than an advertising packet Object Transfer L2CAP Channel: a channel for transmitting a large amount of data through Bluetooth LE GATT Channel: a channel for transmitting and receiving data through the GATT in Bluetooth LE If the Mesh Advertising Extension Channel is used, collision-related performance can be improved because the manager device notifies a dedicated channel in which firmware data is transmitted through an advertising packet and thus there is a poor probability that a collision between data may occur.

That is, performance can be improved because a data channel is used to transmit data and thus there is a poor probability that a collision may occur.

If the firmware data is transmitted through an L2CAP Channel, the manager device may form an L2CAP connection with the target device.

A channel may be selected based on an interference degree of a mesh network and a requirement for transmitted data. The selected channel may be changed based on the situation of the channel, an interference degree and a requirement.

For example, a channel may be selected or changed depending on whether contents that need to be considered in a large amount of transmitted data are latency or reliability.

If the transmission speed of firmware data becomes slow, the manager device may transmit the firmware data through a Mesh Advertising channel. In this case, this may be changed based on a Scheduled Time included in a request message.

Furthermore, the manager device may control the selection and change of a channel based on the configuration of a topology (a total number of relay nodes configuring a mesh network, the number of generated packets, or an average hop count from a source node to a destination).

The firmware data may be fragmented and transmitted based on a size supported by each channel in order to be transmitted through a selected channel.

Thereafter, when the firmware data is fully transmitted and the update of the firmware is completed, the target device may notify the manager device the completion of the update by transmitting a complete message (S14050).

Through such a method, a large amount of firmware can be transmitted and received through a channel for a large amount of data, which is different from an advertising packet, in a Bluetooth mesh network.

Figure 15:
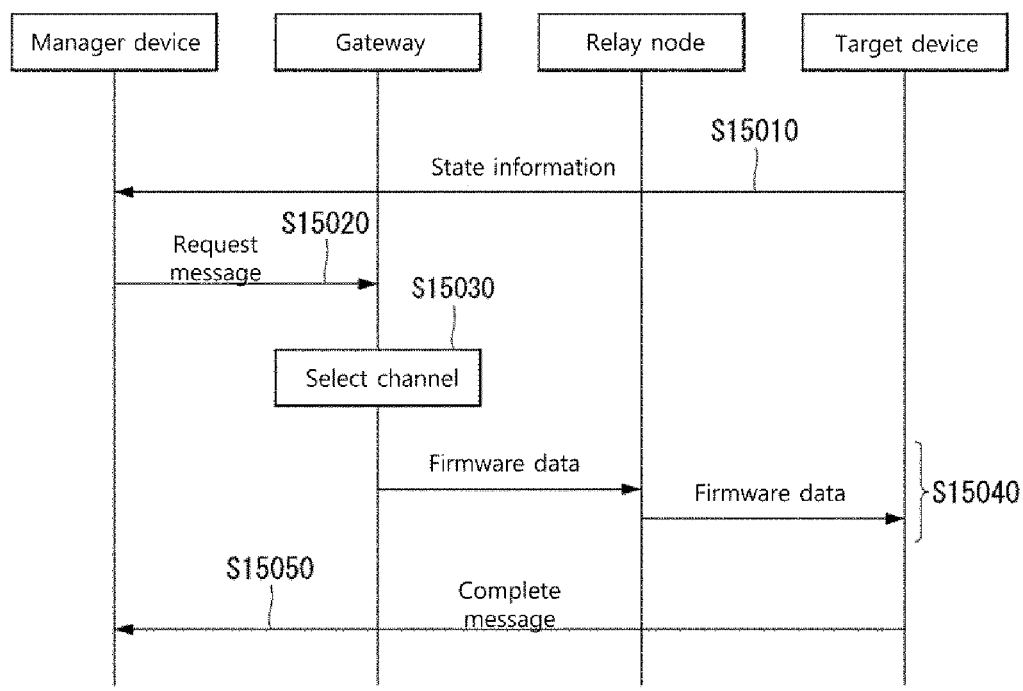
FIG. 15 is a flowchart illustrating another example of a method for transmitting and receiving a large amount of firmware data for providing service in a mesh network, which is proposed in the disclosure.

FIG. 15 is a flowchart illustrating another example of a method for transmitting and receiving a large amount of firmware data for providing service in a mesh network, which is proposed in the disclosure.

Referring to FIG. 15, if a manager device cannot directly transmit firmware data to a target device, it may transmit the firmware data to the target device through a specific channel for the update of firmware for providing a specific service using a gateway.

First, step S15010 is the same as step 14010 of FIG. 14, and a description thereof is omitted.

Thereafter, the manager device transmits, to the gateway, a request message to request the firmware update of the target device (S15020).

In this case, the request message may further include the following parameters in addition to the parameters included in the request message of FIG. 14.

Destination: An ID for Identifying a Target Device

After receiving the request message from the manager device, the gateway may identify the target device whose firmware will be updated based on the destination of the request message, and may select a channel for transmitting firmware data (S14030).

In this case, a method of selecting and changing the type of selected channel and a channel are the same as the method described in FIG. 14.

If the gateway transmits the firmware data through an L2CAP Channel, the gateway may form an L2CAP connection with a relay node. The relay node may form an L2CAP connection with the target device and transmit the firmware data.

Thereafter, the gateway transmits the firmware data to the target node through the selected channel (S15040).

In this case, if the gateway cannot directly transmit the firmware data to the target device, the gateway may transmit the firmware data to the target device through the relay node.

The firmware data may be segmented and transmitted based on a size supported by each channel in order to be transmitted through a selected channel as described in FIG. 14.

Thereafter, when the firmware data is fully transmitted and the update of the firmware is completed, the target device may notify the manager device or the gateway of the completion of the update by transmitting a compete message (S15050).

Figure 16:
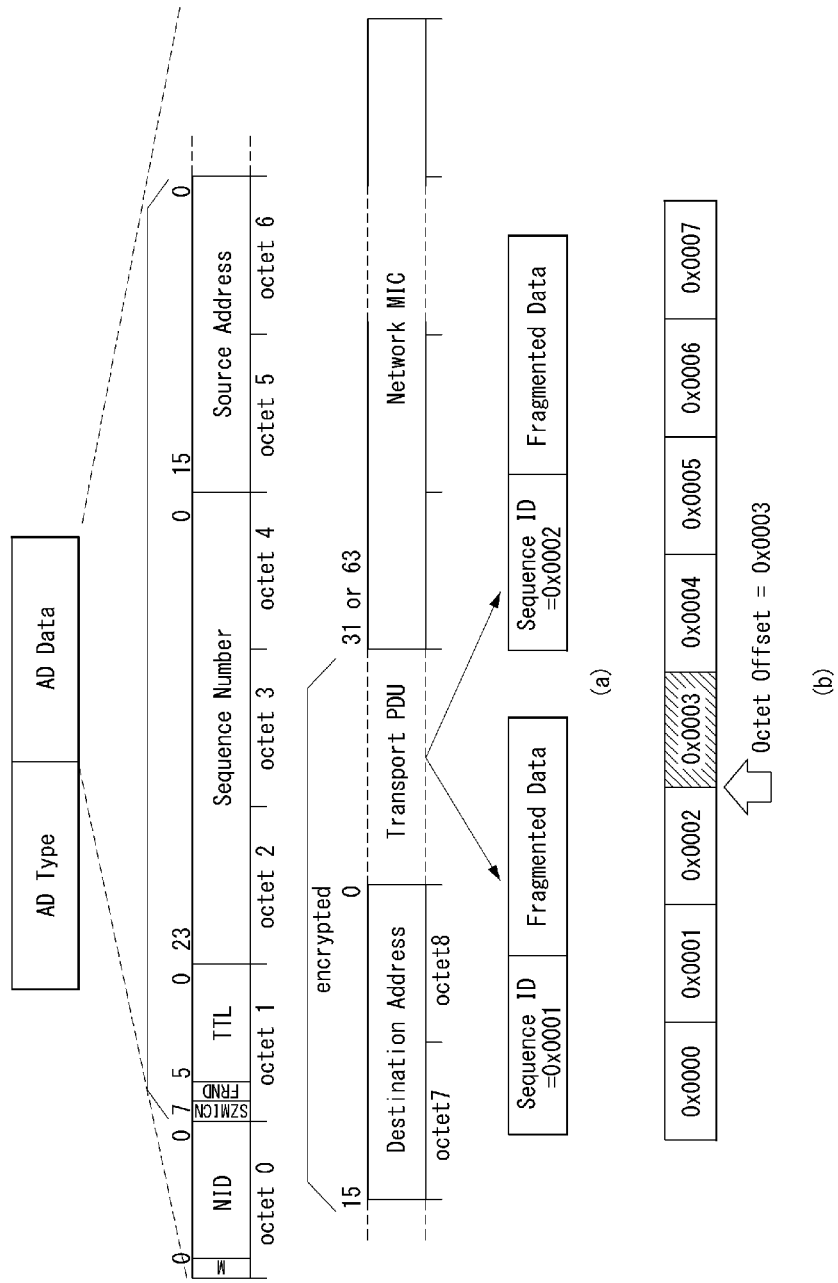
FIG. 16 is a diagram illustrating an example of a data format for transmitting and receiving a large amount of firmware, which is proposed in the disclosure.

FIG. 16 is a diagram illustrating an example of a data format for transmitting and receiving a large amount of firmware, which is proposed in the disclosure.

Referring to FIG. 16, the firmware data described in FIGS. 14 and 15 may be segmented and transmitted based on a size supported by each channel so that the firmware data can be transmitted through a selected channel.

Specifically, although the firmware data is transmitted using the method described in FIGS. 14 and 15, a large amount of data cannot be included in a single packet like the firmware data.

Accordingly, a device that transmits firmware data may perform a fragmentation procedure for fragmenting the firmware data.

The firmware data may be fragmented as illustrated in FIG. 16(*a*). The fragmented data has a sequence according to a fragmentation method. Accordingly, an identifier (hereinafter sequence ID) informing that the fragmented data corresponds to any one of all fragmented data included in the firmware data.

The identifier assigned to the fragmented data may be a sequence number provided in a mesh network or may be added and included in the application data part of a mesh network.

If a large amount of data is transmitted in a mesh network of Bluetooth LE, a packet transmitted by a manager device or a gateway is not received by the target device in the sequence of a Sequence ID.

Accordingly, a target device needs to configure firmware data again based on a Sequence ID assigned to fragmented data, and may notify the manager device or the gateway of data that needs to be received by the target device.

Specifically, the target device receives the fragmented data from the manager device or the gateway, and transmits, to the manager device or the gateway, the Sequence ID of data to be subsequently transmitted as an offset value based on Sequence ID of the received data.

In this case, the target device may increase an offset value based on the Sequence ID of the received data.

If the offset value is not equal for a given time (e.g., Offset Increase Waiting Time) while fragmented firmware data is received, the target device requests the retransmission of data by transmitting a request message, including the offset value, to the manager device or the gateway.

That is, the location of the first octet that needs to be received (or read) by the target device may be specified by the offset value.

For example, as illustrated in FIG. 16(b), if an offset value does not increase at "0x0003", the target device transmits a request message, including the value of "0x0003", to the manager device or the gateway.

The manager device or the gateway may recognize that data having the Sequence ID of "0x0003" has not been transmitted based on the offset value of the request message transmitted by the target device, and may transmit, to the target device, again the data having the Sequence ID of "0x0003."

Through such a method, a target device can receive, from a manager device or a gateway, all data without lost data although a large amount of firmware data is fragmented and transmitted, and can update firmware.

The aforementioned disclosure is not limitedly applied to the elements and methods of the aforementioned embodiments, and some of or all the embodiments may be selectively combined and configured so that the embodiments can be modified in various manners Furthermore, the disclosure described above may be substituted, modified and changed in various ways by a person having ordinary skill in the art to which the disclosure pertains without departing from the technical spirit of the disclosure, and thus is not restricted by the aforementioned embodiments and the accompanying drawings.

INDUSTRIAL APPLICABILITY

The disclosure relates to Bluetooth data transmission and reception and, more particularly, to a method and device for providing service through wireless communication means using a Bluetooth low energy (LE) technology.

The invention claimed is:

1. A method for transmitting and receiving data for providing, by a first manager device, a specific service in a mesh network of a wireless communication system, the method comprising:
receiving, from a target device, state information related to a firmware update for providing a specific service;
transmitting, to the target device, a request message to request the firmware update of the target device based on the state information;
selecting a specific channel among a plurality of channels for a transmission of firmware data, wherein the plurality of channels are channels configured to transmit and receive data of one or more at least a specific sizes size;
transmitting the firmware data through the specific channel;
receiving, from the target device, a message indicating completion of the firmware update,
wherein the state information comprises a version identifier indicative of a current version of the firmware,
receiving, from the target device, an advertising packet in order to provide the specific service, wherein the advertising packet comprises environment information measured by the target device and location information for estimating a location of the target device;
estimating the location or direction of the target device based on the location information;
performing a specific operation for providing the specific service based on the estimated location,
receiving, from a second manager device, a negotiation request message for determining a manager device for performing the specific operation, wherein the negotiation request message comprises a first general parameter and first specific parameter for determining the manager device;
determining the manager device among the first manager device and the second manager device based on the first general parameter, the first specific parameter, a second general parameter, and a second specific parameter; and
transmitting, to the second manager device, a negotiation response message comprising determination information indicative of the determined manager device,
wherein the specific operation is performed by the determined manager device.

2. The method of claim 1, further comprising:
forming a logical link control and adaptation protocol (L2CAP) connection with the target device, wherein the specific channel is an L2CAP channel.

3. The method of claim 1, wherein the specific channel is selected based on at least one of interference of the mesh network, latency necessary for the firmware data, or reliability.

4. The method of claim 1, further comprising:
fragmenting the firmware data into a plurality of data based on a data size supported by the specific channel,
wherein each the plurality of fragmented data comprises an identifier indicating that the fragmented data corresponds to specific fragmented data of the firmware data, and
wherein the state information further comprises a product identifier identifying the target device.

5. A method of for transmitting and receiving data for providing, by a first manager device, a specific service in a mesh network of a wireless communication system, the method comprising:
receiving, from a target device, state information related to an update of firmware for providing a specific service;
transmitting, to the target device, a request message to request the update of the firmware of the target device based on the state information;
selecting a specific channel among a plurality of channels for a transmission of firmware data, wherein the plurality of channels are configured to transmit and receive data of at least a specific size;
transmitting the firmware data through the specific channel; and
receiving, from the target device, a message indicating completion of the firmware update,
wherein the state information comprises a version identifier indicative of a current version of the firmware,
receiving an advertising packet from the target device and each of a plurality of adjacent target devices in order to provide the specific service, wherein each of the advertising packets comprises environment information measured by a corresponding one of the plurality of adjacent target devices and the target device and location information for estimating a location of the target device;

calculating a distance value indicative of a distance from the first manager device to the target device or the plurality of adjacent target devices based on the location information;

calculating a control value for the locations of the target device or each of the plurality of target devices on which a specific operation is to be performed based on the environment information and the calculated distance value; and performing the specific operation based on the calculated control value.

6. The method of claim 5, wherein the control value is calculated by of multiplying the distance value and a specific scale factor.

7. A first manager device for providing a specific service in a mesh network of a wireless communication system, the first manager device comprising:

a transceiver; and a processor functionally connected to the transceiver, wherein the processor is configured to:

receive, from a target device, state information related to a firmware update for providing a specific service;

transmit, to the target device, a request message to request the firmware update of the target device based on the state information;

select a specific channel among a plurality of channels for a transmission of firmware data, wherein the plurality of channels are configured to transmit and receive data of at least a specific size;

transmit the firmware data through the specific channel; and receive, from the target device, a message indicating completion of the firmware update, wherein the state information comprises a version identifier indicative of a current version of the firmware, receive, from the target device, an advertising packet in order to provide the specific service, wherein the advertising packet comprises environment information measured by the target device and location information for estimating a location of the target device;

estimate the location or direction of the target device based on the location information;

perform a specific operation for providing the specific service based on the estimated location, receive, from a second manager device, a negotiation request message for determining a manager device for performing the specific operation, wherein the negotiation request message comprises a first general parameter and first specific parameter for determining the manager device;

determine the manager device among the first manager device and the second manager device based on the first general parameter, the first specific parameter, a second general parameter, and a second specific parameter; and transmit, to the second manager device, a negotiation response message comprising determination information indicative of the determined manager device, wherein the specific operation is performed by the determined manager device.

* * * * *